United States Patent [19]

Weisbrod

[11] 4,429,770

[45] Feb. 7, 1984

[54] FRICTION LINING CARRIER MEMBER HAVING REPLACEABLE FRICTION LININGS

[75] Inventor: Helmut Weisbrod, Bad Nauheim, Fed. Rep. of Germany

[73] Assignee: ITT Industries, Inc., New York, N.Y.

[21] Appl. No.: 441,460

[22] Filed: Nov. 15, 1982

Related U.S. Application Data

[63] Continuation of Ser. No. 205,132, Nov. 10, 1980, abandoned.

[30] Foreign Application Priority Data

Nov. 26, 1979 [DE] Fed. Rep. of Germany ....... 2947606

[51] Int. Cl.³ .................... F16D 51/00; F16D 69/04
[52] U.S. Cl. .................................. 188/73.32; 29/433; 188/218 XL; 188/244; 188/250 G; 403/355
[58] Field of Search ............. 188/218 XL, 73.2, 73.1, 188/18 A, 73.32, 250 A, 250 G, 250.3, 366, 206 R, 244, 245, 246; 192/70.13, 107 R; 29/433; 403/355, DIG. 7

[56] References Cited

U.S. PATENT DOCUMENTS

| 2,236,311 | 3/1941 | Eksergion | 188/244 |
| 2,485,082 | 10/1949 | Bachman | 188/218 XL |
| 2,913,081 | 11/1959 | Rudisch | 192/107 R X |
| 3,746,139 | 7/1973 | Bok et al. | 188/218 XL X |
| 4,060,286 | 11/1977 | Boice | 29/433 X |

FOREIGN PATENT DOCUMENTS

| 927905 | 5/1955 | Fed. Rep. of Germany . |
| 2100009 | 9/1971 | Fed. Rep. of Germany . |
| 2064032 | 6/1981 | United Kingdom ......... 188/218 XL |

*Primary Examiner*—Douglas C. Butler
*Attorney, Agent, or Firm*—James B. Raden; Marvin M. Chabin

[57] ABSTRACT

The circular friction lining carrier member having replaceable friction linings comprising radially inner and outer circumferential grooves in the carrier member to guide and hold the linings and a supporting element disposed between adjacent ones of the linings to transmit circumferential forces with the supportive elements being undetachably secured to the carrier member with radial clearance between the side walls of both grooves.

9 Claims, 6 Drawing Figures

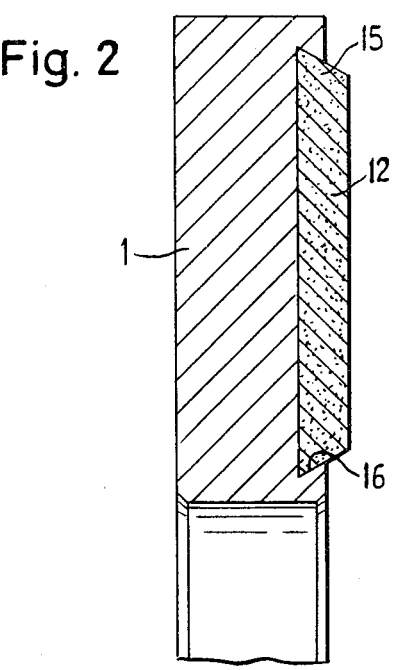
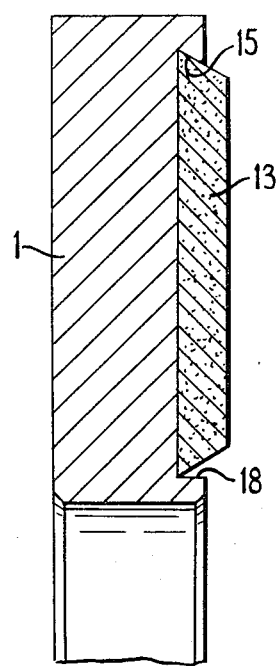
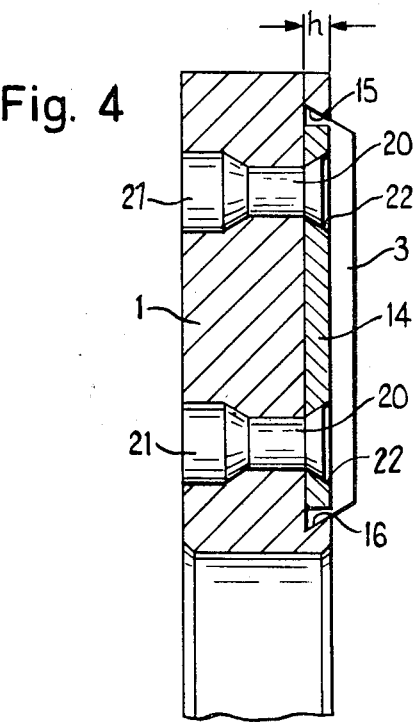
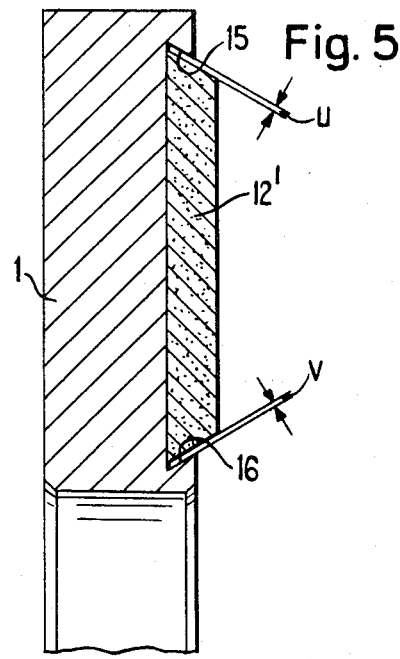

{ 4,429,770 }

FRICTION LINING CARRIER MEMBER HAVING REPLACEABLE FRICTION LININGS

CROSS-REFERENCE TO RELATED APPLICATION

This is a continuation of application Ser. No. 205,132, filed Nov. 10, 1980, now abandoned.

BACKGROUND OF THE INVENTION

The present invention relates to a circular friction lining carrier member with replaceable friction linings, in particular, for clutch-type disc brakes having the friction linings guided and held captive radially inwardly and outwardly in circumferential grooves and a separating or supporting element arranged between each of the friction linings.

A friction lining carrier member of this type is known from German Pat. DE-OS No. 2,100,009. The grooves of the friction lining carrier member forming the guidance are of dove-tailed cross section. The guidance has disposed thereacross separating or supporting elements which are rigidly connected to the friction lining carrier member and have a radially extending groove open relative to the guidance. More particularly, two friction linings are placed in the guidance communicating with each other via a conical separating element situated in the guidance. The conical separating element is constructed such that its radially extending rims intersect in the central point of the circle assigned to the circular segment. In addition to this, the separating element includes radially extending grooves open relative to the guidance resulting in the friction linings being positioned with their entire periphery in a groove. To accomplish this, the friction linings are chamfered at all four edges and are of a trapezoidal configuration. The friction linings are inserted in the friction lining carrier member in such a way as to be positioned with their entire periphery fixed without clearance in the dovetailed grooves.

Since the separating element is constructed as a sector of a circular ring having the same radius as the friction lining carrier member and the friction linings disposed thereon manufacture of the parts entails great expenditure of time and effort resulting in high costs. Since the end surface of the separating element and an end surface of a friction lining have to abut each other without clearance, high requirements regarding manufacturing accuracy have to be met which has impeded mass production.

Furthermore, friction linings are subjected to different mechanical loads. When a circular-like friction lining carrier member having friction linings disposed thereon is brought in frictional engagement with a disc rotating in the main direction of rotation, the friction linings will transmit the friction forces occurring onto that clamping element lying in the rear of the friction lining when looking towards the main direction of rotation. In this structure, the friction lining directly adjacent to the clamping element will have to transmit all circumferential forces of all of the friction linings inserted ahead of it, since the separating elements are not connected to the friction lining carrier member in the circumferential direction. Thus, the friction lining closest to the clamping element is required to transmit all circumferential forces occurring. Due to this increased mechanical load, this friction lining is subjected to greater wear resulting in the friction volume available at the other linings not being permitted to be fully utilized. This disadvantage will have a greater effect as the number of individual friction linings disposed on the friction lining carrier member is increased. Moreover, the clamping element receiving the braking forces has to be fixed to the friction lining carrier member in a particularly costly manner to provide transmission of the braking forces without the clamping element being torn out of its anchor.

A different arrangement of several friction linings on a friction lining carrier member is described in German Pat. DE-PS No. 927,905. The friction linings are rigidly arranged on backing plates, with the backing plates including mechanisms in the circumferential direction, by which they are fastened to mechanisms on the friction lining carrier member. Each single fastening mechanism has to be secured against detachment which increases the expenditure for such an arrangement considerably. Since the backing plate is of relatively thin design in such an arrangement, a so-called bimetal effect will occur in the event of a braking operation having a great thermal conversion of energy, since the friction lining, its backing plate and the friction lining carrier member will warm up and differing coefficients of thermal expansion are normally prevailing. Due to this, the friction lining will be curved axially so that it is not possible to urge the entire surface of the friction lining into frictional engagement with the disc. A partial wear of the friction lining is the result. In addition, the bimetal effect leads to a separation of friction lining and carrier member material and, thus, to a premature total detachment of the friction lining material, and as a consequence a complete failure of the brake.

SUMMARY OF THE INVENTION

It is, therefore, an object of the present invention to provide a friction lining carrier member, in particular, for clutch-type disc brakes, which avoids the above-mentioned disadvantages, in which the friction linings may be easily replaced without need for special tools and in which each friction lining is subjected to the same mechanical loads. In addition, the friction linings employed are simple to manufacture and, thus, of lower cost.

A feature of the present invention in the provision of a circular friction lining carrier member having a plurality of replaceable friction linings comprising: the carrier member having a first groove disposed at an outer portion thereof and a second groove disposed at an inner portion thereof, the plurality of linings being guided in and held captive in the first and second grooves; and a supporting element for transmitting circumferential forces acting on the plurality of linings disposed between each adjacent ones of the plurality of linings, each of the supporting elements being immovably fastened to the carrier member by at least one fastening element with each end of each of the supporting elements being spaced from an associated one of the first and second grooves.

The supporting elements enable ease of replacement. Since the friction linings do not have mechanisms for fastening them to the friction lining carrier member, their manufacture is of particularly low cost.

The supporting element is favorably constructed as a rectangular square member so that the supporting elements are allowed to be manufactured from simple rod stock and thereby permit a reasonably priced mass production. The height of the square member is lower than or equal to the depth of the grooves housing the friction linings and as a result, a maximum utilization of the friction linings is guaranteed.

A particularly simple method of fastening the supporting elements to the friction lining carrier member is by riveting the supporting element on the friction lining carrier member.

By constructing the friction linings in such a manner that the side surfaces of the friction linings close to the square member extend parallel to the side surface of the square member, an equally distributed mechanical load on the side surface transmitting the supporting forces is ensured.

A possibility of simple manufacture is that the side surfaces of the friction linings, which are graphically prolonged, intersect in a point spaced from the central point of the circular friction lining carrier member, with both points being on an axis of symmetry of the friction lining.

Because the newly mounted friction lining is situated in the friction lining carrier member with radial clearance in the grooves and in circumferential direction with clearance between the supporting elements, the friction lining is permitted a specific expansion upon increased thermal stress. The bimetal effect is thus eliminated completely. In addition to this, the construction ensures a simple filling of the friction lining carrier member, since a jamming or canting of the friction linings during the filling process will be avoided.

For internally expanding clutch-type disc brakes, the friction lining carrier member is advantageously constructed as a complete circular ring, the inner and the outer rim of which includes the circumferential grooves.

A simple arrangement for inserting the friction linings into the friction lining carrier member is provided by the inner or the outer, preferably the inner, groove being interrupted along a sector of the circular ring, with the arc of the sector corresponding to the outer arc of the friction lining. When the friction lining carrier member is filled with all of the friction linings, the friction linings are displaced in the circumferential direction by a pitch angle less than the pitch angle of the sector interrupting one of the grooves and, thus, are secured against dropping out of the carrier member by the inner and outer grooves holding a portion of its two linings disposed in the sector. Thus, a simple closing of the filling opening of the friction lining carrier member is guaranteed without additional means.

BRIEF DESCRIPTION OF THE DRAWING

Above-mentioned and other features and objects of this invention will become more apparent by reference to the following description taken in conjunction with the accompanying drawing, in which:

FIG. 2 is a cross sectional view of the friction lining carrier member taken along the line II—II of FIG. 1;

FIG. 3 is a cross sectional view of the friction lining carrier member taken along the line III—III of FIG. 1;

FIG. 4 is a cross sectional view of the friction lining carrier member taken along the line IV—IV of FIG. 1;

FIG. 5 is a cross sectional view of the friction lining carrier member with new friction linings not yet placed in service taken along line II—II of FIG. 1.

DESCRIPTION OF THE PREFERRED EMBODIMENT

Figure 1:
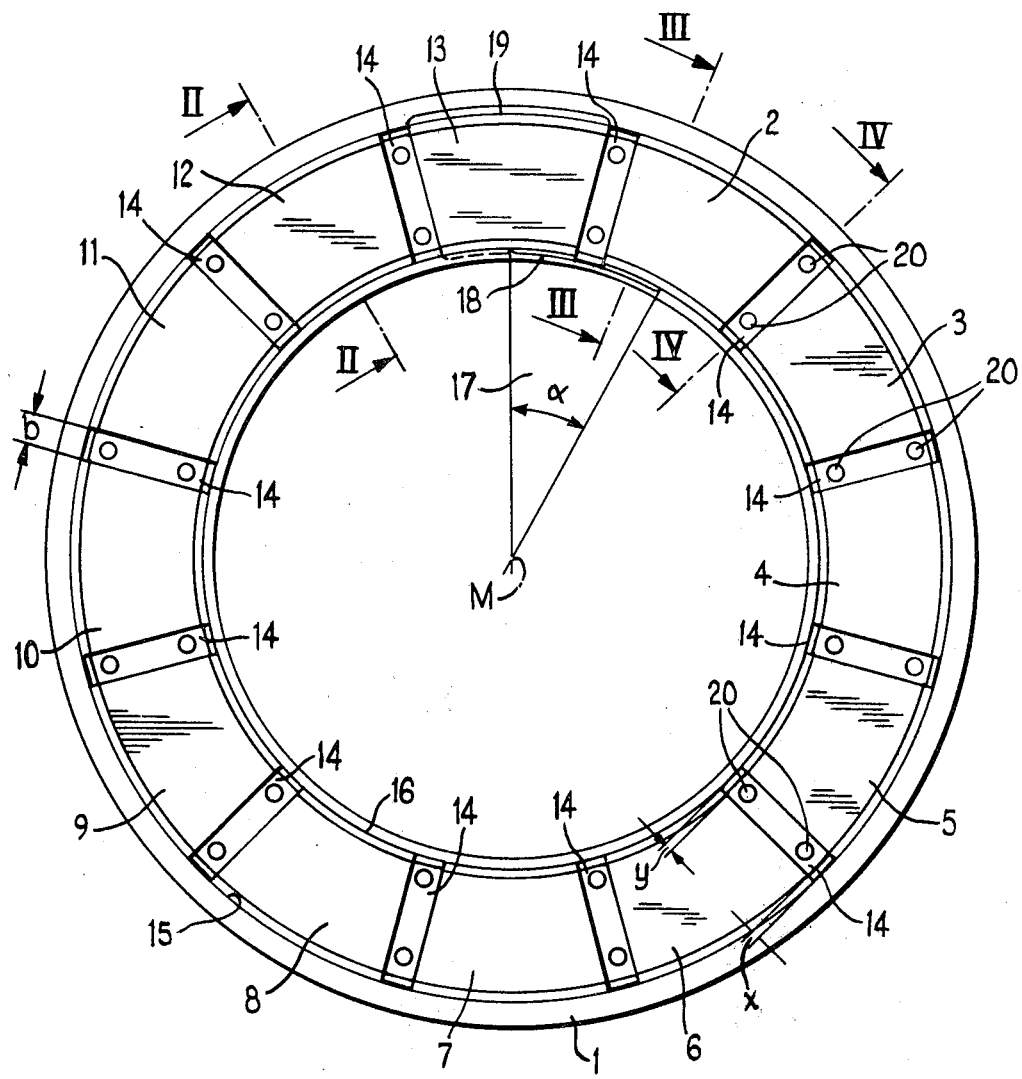
FIG. 1 is a top view of a friction lining carrier member constructed as a complete circular ring that has been placed in service in accordance with the principles of the present invention.

In FIG. 1, the friction lining carrier member constructed as a complete ring is assigned reference numeral 1, the friction linings or elements are designated by reference numerals 2 to 13, and the supporting elements are assigned the reference numeral 14. The friction lining carrier member 1 has at its inner rim a groove 16 and at its outer rim a groove 15 with grooves 15 and 16 facing each other. The inner groove 16 is interrupted along a sector area 17. The arc length 18 of sector area 17 corresponds to the arc length 19 of friction linings 2 to 13 so that friction linings 2 to 13 are able to be inserted through sector area 17 into the guidance formed by grooves 15 and 16. After all friction linings 2 to 13 are this way inserted into friction lining carrier member 1, the friction linings will be displaced by the angle $\alpha/2$ in the circumferential direction of friction lining carrier member 1 so that a first portion of two friction linings 2 and 13 will be positioned within sector area 17. However, a second portion of both friction linings 2 and 13 will be held axially by grooves 15 and 16. A supporting element 14 constructed as a rectangular member is now inserted between adjacent ones of friction linings 2 to 13, with the side surfaces of a friction lining being parallel to the side surfaces of the supporting elements adjacent to it. The radial axis of symmetry of supporting elements 14 as well as of friction linings 2 to 13 intersect in the central point M of the circular ring providing carrier member 1. Supporting elements 14 are fastened to friction lining carrier member 1 by rivets 20 and are positioned with radial clearance x and y between grooves 15 and 16, respectively, such that they are not in positive engagement with grooves 15 and 16.

The insertion of friction linings 2 to 13 into, as well as the construction of friction lining carrier member 1 will now be discussed in detail with reference to FIGS. 2 to 5. In the area outside sector 17 according to the cross-section along line II—II of FIG. 1 shown in FIG. 2 friction lining carrier member 1 includes dove-detailed grooves 15 and 16 in which friction lining 12 is stationarily inserted after a braking operation.

FIG. 5 shows a friction lining 12' having a clearance u and v between grooves 15 and 16 respectively, as well as between supporting elements 14 (not illustrated) propr to a braking operation. Friction lining 12' is able to move in its holder in all directions so that the filling of friction lining carrier member 1 with such friction linings 2'-13' may be easily carried out, because a jamming or a canting of the linings is excluded to a large extent. Upon thermal expansion, each lining is allowed sufficient space so that a bimetal effect is prevented.

FIG. 3 shows the cross section of friction lining carrier member 1 along line III—III of FIG. 1 at sector 17. Groove 16 is interrupted to provide an arched rim 18, which although it supports lining 2 radially, is not in a position to provide a support axially at the inner rim in about half of the overall circumferential length of friction linings 2 and 13.

FIG. 4 shows a cross section through a supporting element 14 which is fixed to friction lining carrier member 1 by means of two rivets 20 placed in stepped bores 21 of friction lining carrier member 1 as well as in funnel-shaped bores 22 of supporting element 14. Due to the riveting process, supporting element 14 is rigidly pressed against friction lining carrier member 1 and is thus fixed immovably in the circumferential direction of the brake disc. The height h of square supporting element or member 14 is such that the efficient utilization of the friction linings is guaranteed. Advantageously, the height h of square member 14 is smaller than the depth of grooves 15 and 16.

Figure 6:
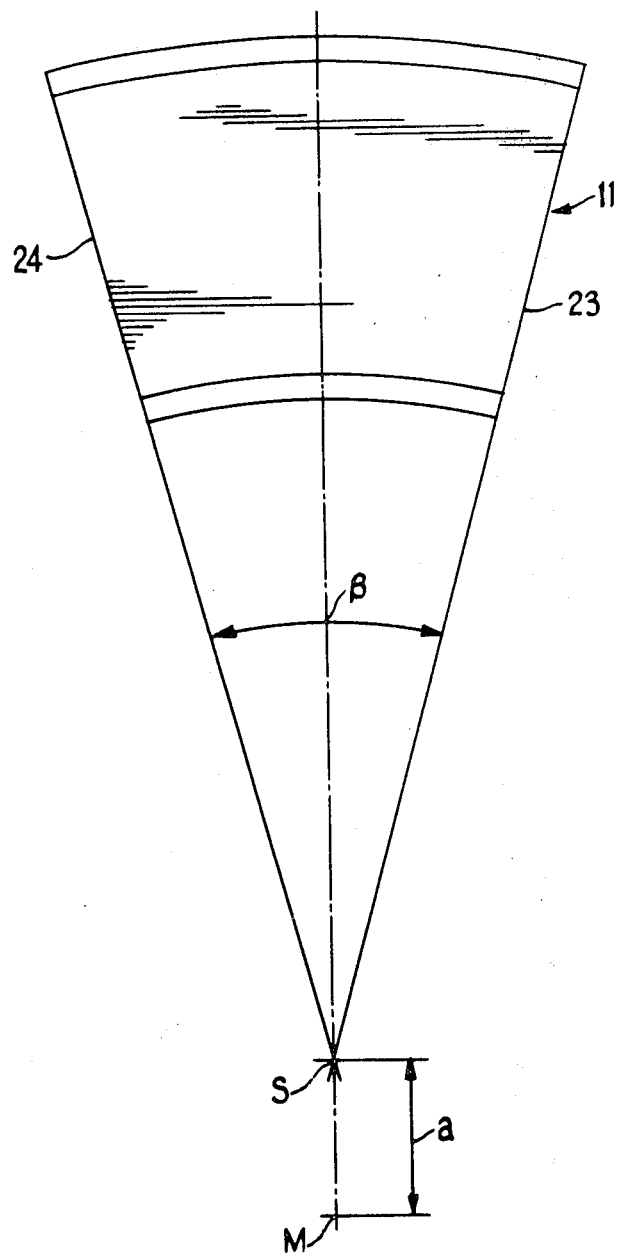
FIG. 6 is an illustration of the geometrical form of a single friction lining employed in the arrangement of FIG. 1.

The geometrical form of friction linings 2–13, for example, lining 11, is illustrated in FIG. 6. Since supporting elements 14 are of square shape and do not fit into the circle, the graphically prolonged side surfaces 23 and 24 of the friction linings intersect outside the center M of the circular ring at the point S. The distance "a" between the point of intersection S and the circular ring central point M equals "a" and the angle between the two side surfaces is designated $\beta$. The distance "a" from the circular ring central point M is related to the width "b" of supporting elements 14 through the relation $$a = \frac{2b}{\sin \frac{\beta}{2}}.$$

Friction linings 2–13 are chamfered at their outer and inner radial rims only, corresponding to the dove-tailed grooves 15 and 16.

Another possibility of using such a friction lining carrier member is with rotating parts of a brake. Thus, in a like symmetrical arrangement, it is also possible to coat the brake disc with friction material. Possible occurring unbalances of the brake disc constructed as symmetrical friction lining carrier member will be eliminated by methods conventional in motor vehicle technology.

In the case of a brake with carbon fiber friction elements, for instance, the fitting of the friction material onto stator and rotor could be managed without any difficulties by using the friction lining carrier member in accordance with the present invention. Besides, the user is given the choice to apply the desired friction material on stator and/or rotor dependent upon the conditions of application. The problems of manufacturing brake discs of a material which—despite having favorable coefficients of friction—does not inhere a corresponding stability for transmitting high moments, is solved in a simple manner. The friction linings are constructed in their arc length so as to be able to transmit a required moment without being damaged. The sectioning of the circular ring into individual friction segments may be, therefore, made completely contingent on the friction material employed.

To the end that a toothing effect is avoided at the rims of the friction linings with a like coating of stator and rotor, the radially extending edges may be chamfered. Likewise, the lining faces touching each other and their rims could be adjusted such that the extensions thereof cross each other.

The simplest possibility of avoiding the toothing effect is to use a varying number of friction lining segments on stator and rotor. Unevenly constructed lining segments prevent this toothing as well.

While I have described above the principles of my invention in connection with specific apparatus, it is to be clearly understood that this description is made only by way of example and not as a limitation to the scope of my invention as set forth in the objects thereof and in the accompanying claims.

I claim:

1. A circular friction lining carrier member having a plurality of replaceable friction linings comprising:
    said carrier member having a first groove disposed at an outer portion thereof and a second groove disposed at the inner portion thereof, said plurality of linings being guided in and held captive in said first and second grooves; and
    a supporting element for transmitting circumferential forces acting on said plurality of linings during operation to said carrier member disposed between each adjacent ones of said plurality of linings, each of said supporting elements being a solid rectangular member of square cross section immovably fastened to said carrier member by at least one fastening element extending through said rectangular member into said carrier member with each end of each of said rectangular members being radially spaced from an associated one of said first and second grooves, each of said rectangular members being in a non-overlapping, circumferential force transmitting relationship with a length of adjacent edges of said adjacent ones of said plurality of linings coextensive with the length of an associated one of said rectangular members to receive said circumferential force.

2. A carrier member according to claim 1, wherein the height of each of said rectangular member is equal to or less than the depth of said first and second grooves.

3. A carrier member according to claim 1, wherein said fastening element is a rivet.

4. A carrier member according to claim 1, wherein the side surfaces of each of said plurality of friction linings adjacent associated ones of said rectangular members are parallel to the side surfaces of said associated ones of said rectangular members.

5. A carrier member according to claim 4, wherein a graphical extension of said side surfaces of each of said plurality of friction linings intersect at a given point spaced from a central point of said carrier member, said central point and said given point of each of said plurality of friction linings are disposed along an axis of symmetry of an associated one of said plurality of friction linings.

6. A carrier member according to claims 1, 4 or 5, wherein
    each of said plurality of friction linings is positioned in said carrier member with radial clearance in each of said first and second grooves and circumferential clearance between adjacent ones of said supporting elements.

7. A carrier member according to claims 1, 4, or 5, wherein
    said carrier member is a complete circular ring having said first groove disposed in the outer rim thereof and said second groove disposed in the inner rim thereof.

8. A carrier member according to claim 7, wherein one of said first and second grooves is interrupted along a given sector of said circular ring, said given sector having an arc length equal to the outer arc length of each of said plurality of friction linings.

9. A carrier member according to claim 8, wherein said plurality of friction linings are disposed on said carrier member such that one portion of two adjacent ones of said plurality of friction linings occupy said given sector so that the other portion of said two adjacent ones of said plurality of friction lines is held captive by said first and second grooves to prevent said plurality of friction linings from dropping out of said carrier member.

* * * * *